Jan. 30, 1940.    G. MÜLLER    2,188,792
PROTECTIVE MEANS FOR ELECTRIC CIRCUITS
Original Filed Dec. 3, 1935    2 Sheets-Sheet 1
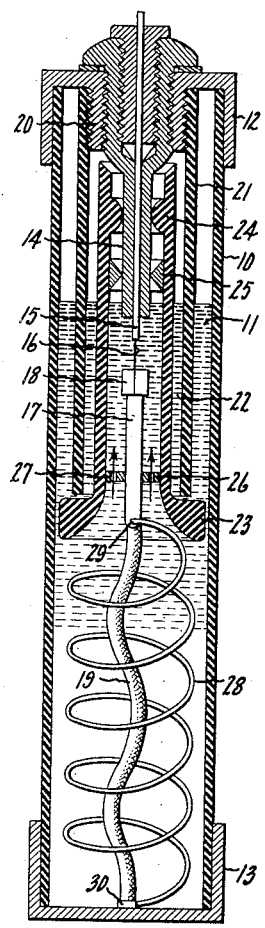
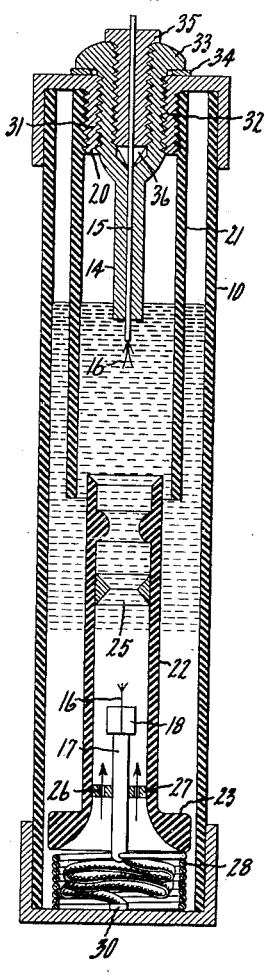
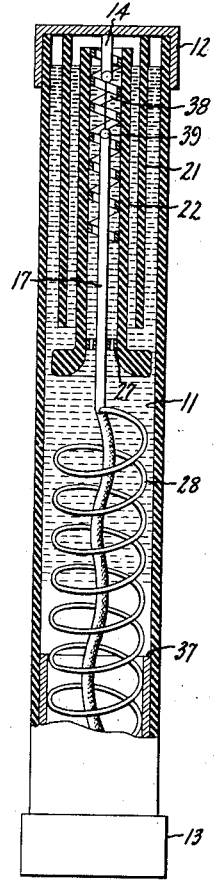
Inventor:
Gustav Müller,
by Harry E. Dunham
His Attorney.

Jan. 30, 1940. G. MÜLLER 2,188,792
PROTECTIVE MEANS FOR ELECTRIC CIRCUITS
Original Filed Dec. 3, 1935 2 Sheets-Sheet 2
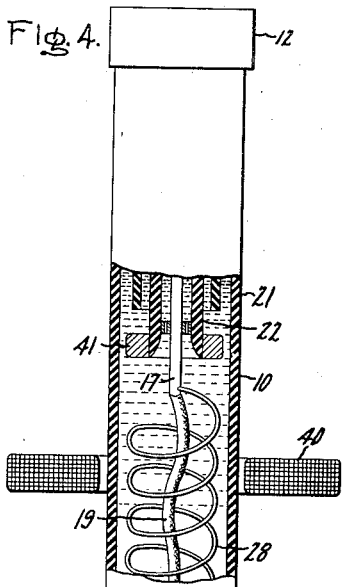
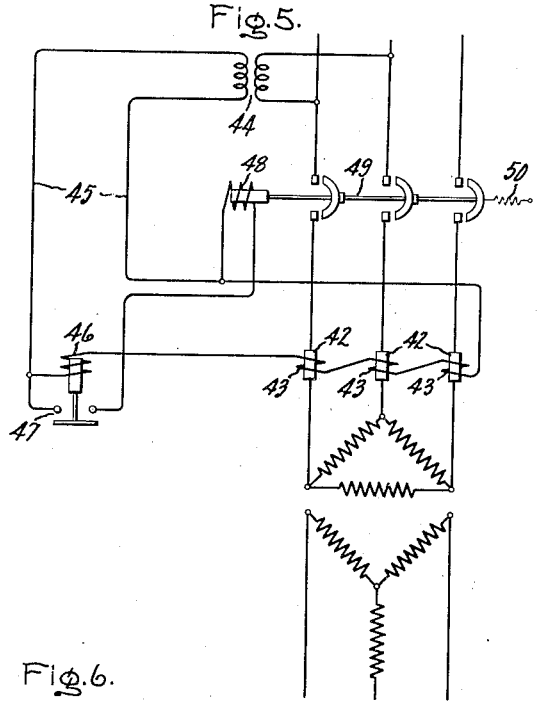
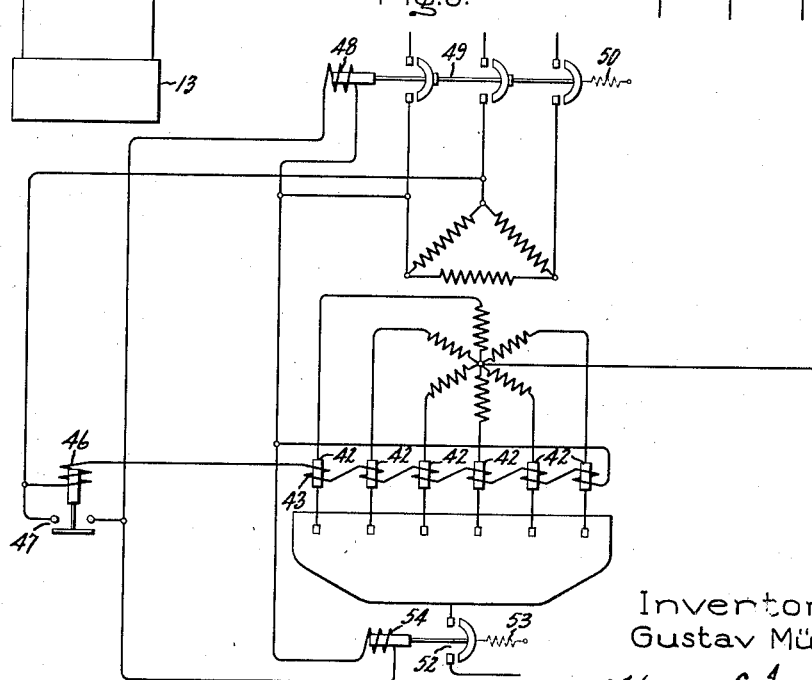
Inventor:
Gustav Müller
by Harry E. Dunham
His Attorney.

Patented Jan. 30, 1940

2,188,792

UNITED STATES PATENT OFFICE 2,188,792

PROTECTIVE MEANS FOR ELECTRIC CIRCUIT

Gustav Müller, Berlin-Charlottenburg, Germany, assignor to General Electric Company, a corporation of New York Original application December 3, 1935, Serial No. 52,711. Divided and this application April 8, 1938, Serial No. 200,956. In Germany December 20, 1934

11 Claims. (Cl. 175—294)

The present invention relates to improvements in protective means for electric circuits, more particularly such circuits as employ fused protective devices, and has for an object the provision of an improved electric circuit protective arrangement and an improved electric protective device for use therein.

This application is a division of my previous application, Serial No. 52,711, filed December 3, 1935 and entitled "Protective means for electric circuits", which previous application is assigned to the same assignee as the present invention.

One of the more particular objects of the present invention is the provision of an improved arrangement for controlling the operation of switching mechanism, such as a disconnect switch, in an electric circuit, in accordance with the operation of a fused protective device in the circuit.

It is also an object of the present invention to provide a fused protective device having improved means for effecting automatic operation of external switching mechanism upon the fusing of the fusible element and resultant separation of the fuse terminals.

Other objects and the details of that which I believe to be novel and my present invention will become apparent from the following description and the claims appended thereto taken in conjunction with the accompanying drawings in which:

Figs. 1, 2 and 3 show two fuse devices, certain features of which constitute the invention claimed in my previously referred to application of which the present application is a division, which devices are illustrative of a form of fused protective device particularly well suited for employment in the practice of the present invention, although, as will become apparent hereinafter, the present invention in its broader aspects may be carried out also with other forms of fused protective devices;

Fig. 4 illustrates a fuse device of the form shown in Figs. 1, 2 and 3, modified in accordance with the present invention;

Fig. 5 illustrates diagrammatically an electric circuit protective arrangement embodying the present invention and employing a fuse of the type illustrated in Fig. 4, and Fig. 6 illustrates the manner of applying the present invention to the protection and isolation of electric conversion apparatus.

Referring to Figs. 1 and 2 of the drawings, 10 denotes a hollow tubular casing of suitable insulation material in which is disposed a body of oil or other arc quenching liquid 11. The upper and lower ends of the casing are provided with metallic end caps 12 and 13 respectively. In the upper cap 12 is mounted a connection terminal or contact 14 through which passes the supporting shank 15 of a fusible element 16. The lower end of the fusible element is attached to a connection terminal or contact 17 in any suitable manner as, for example, by means of a screw cap such as that indicated at 18. The lower end of the terminal 17 is connected by means of the flexible extension conductor 19 to the lower end cap 13.

End cap 12 is provided with an inwardly extending flange 20 having an outer screw threaded portion upon which is mounted a tubular casing 21 of suitable insulation material which extends downwardly in and substantially coaxially of the outer casing 10 to a point considerably below the liquid level line. A third tubular member or casing 22 of insulation material is disposed within the casing 10 and is shown in Fig. 1 as being telescoped within the tube 21. The inner tube 22 is arranged to slide within the casing 10 into and out of the tube 21 and is provided with an outwardly extending shoulder 23 which serves to guide the tube in the casing 10. The tube 22 is also formed with an inwardly projecting portion 24 and is provided with an inwardly projecting annular metallic ring 25, which projections aid, when the parts of the fuse device are in the position shown in Fig. 1, in maintaining the tube 22 substantially coaxial with the tube 21 and the casing 10. Adjacent the lower end of the tube 22 is rigidly mounted a disc 26 having apertures 27 for a purpose to be pointed out hereinafter. This disc supports rigidly the lower connection terminal 17 and constrains this terminal to move with the tube 22. 28 denotes a tension spring having one end connected to the connection terminal 17 as indicated at 29 and the other end connected to the end cap 13 as indicated at 30.

In order that the fusible element may be renewed, the upper portion 31 of the connection terminal 14 is made thimble-shaped with the outer surface 32 screw threaded to engage cooperating screw threads on the inner surface of the flange 20 of the screw cap 12. The upper end of the thimble-shaped portion is provided with an outwardly extending flange 33 which cooperates with the gasket 34 and the upper surface of the cap 12 to provide a seal for the upper end of the casing 10. The inner surface of the thimble-shaped portion 31 is also provided with screw threads to receive the screw-threaded clamping plug 35 which has an axially extending passage to receive the supporting shank 15 of the fusible element. This plug 35 is arranged to press downwardly upon the wedge-shaped member 36, also centrally bored to receive the shank 15, and to thereby effect a strong clamping action upon the shank. When the upper connection terminal is removed from its mounting in the end cap, an opening through the flanged portion 20 is provided through which the screw cap 18 of the movable terminal 17 can be unscrewed by means of a long screw driver. A new fusible element and its supporting shank may then be inserted through the opening in the cap 12 and the lower end of the fusible element may be clamped to the terminal 17 by means of the screw cap 18. Terminal 14 is slipped over the supporting shank of the fusible element and is screwed into place as previously indicated. The projecting end of the shank 15 is then pulled out to a sufficient extent to bring the shoulder 23 of the tube 22 into engagement with the lower end of the tube 21 whereupon the shank is clamped in place by means of the wedge-shaped member 36 and the screw plug 35.

When the element 16 fuses, the spring 28 fixed to the movable terminal 17 draws the terminal and also the tube 22 downwardly to the position shown in Fig. 2. It will be seen that the two tubes 21 and 22 serve as an arc quenching pressure resistant chamber which is extended as the arc is extended. Tube 22 has such length that it is not completely withdrawn from the lower end of the tube 21. Thus the arc drawn between the terminals 14 and 17 is forced to remain within the pressure chamber until quenched. The ring-shaped metallic projecting member 25, it being understood that several of these rings may be provided if desired, serves to provide the arc with additional points of attachment so that fresh arcing, as for example in the case of alternating current, is hindered. Furthermore, during the downward drawing of the tube 22 under the influence of the spring 28, streams of the oil or other arc quenching liquid 11 are projected by means of the apertures 27 in the direction indicated by the arrows into proximity to the end of the terminal 17 and into the arc path so that metal particles are driven away from the terminal and from the arc path. A better quenching action is secured thereby and also fresh arcing is hindered.

Fig. 3 shows a modified construction in which the movable pressure tube 22 is not drawn out to the bottom of the casing 10 but is prevented in this construction from being completely withdrawn from the tube 21 by means of the projecting stop 37. Furthermore, in order to obtain a better quenching action at quite high voltage, a projecting baffle 38 is wound spirally upon the inner surface of the tube 22 in order to give the liquid discharged through the apertures 27 a screw-like motion. In this manner the tearing away of the metal particles from the point of attachment 39 of the arc is made to take place to a greater degree than would be provided by the simple flow of the liquid upwardly through the tube 22. The projection 24, of which there may be several, provided on the inner surface of the tube 22 as shown in Fig. 1 is capable of fulfilling substantially the same purpose as the screw-like baffle shown in Fig. 3.

A third modification of my improved fuse construction is illustrated in Fig. 4. In this last construction an inductive coil 40 is mounted in any suitable manner upon the casing 10 and concentrically with relation to the casing. This coil may be connected in an alternating current circuit as will be pointed out hereinafter. The lower end of the movable tube 22 is provided with a core member 41 of iron or other suitable magnetizable material so that when the tube 22 is drawn downwardly under the influence of the spring 28 subsequent to rupture of the fusible element, the core member is also drawn downwardly and into the magnetic field of the coil 40. This has the effect of reducing the reluctance of the magnetic path of the coil with a consequent increase in the inductance of the coil.

The action of the fuse device illustrated in Fig. 4 may be utilized to great advantage in the actuation of switching mechanism. In Fig. 5 is illustrated diagrammatically the manner in which such a fuse device may be employed as a protective device for a polyphase alternating current circuit. Three fuses 42, of the type illustrated in Fig. 4, are connected one in each of the phase conductors of the three phase circuit and each of the fuses has associated therewith an inductive coil 43 similar to that designated by the numeral 40 in Fig. 4. A source of potential 44 supplies current through conductors 45 and the inductive coils 43 to the coil 46 of relay 47, the contacts of which relay are connected in series with the operating or holding coil 48 of the circuit interrupting device 49 which is arranged to interrupt all three phases of the three phase circuit. 50 designates a spring for biasing the movable contacts of the interrupting device 49 to open position. Under normal conditions sufficient current flows in the circuit of coil 46 to maintain relay 47 closed so that holding coil 48 is energized to maintain the circuit interrupter 49 closed. Upon the occurrence of a fault in any one of the phases of the three phase circuit, the corresponding fuse 42 operates and the core 41 thereof (shown in Fig. 4) is drawn downwardly into the magnetic field of its associated coil 43 thus increasing the inductive reactance of the circuit in which the coils 43 are connected and reducing the current flow through the relay coil 46. The coil 46 thereupon permits relay 47 to drop out and thereby open its contacts to effect deenergization of the holding coil 48 and opening of the three phase circuit interrupting switch 49 under the influence of spring 50. In Fig. 5 the elements of the electric circuit are shown in the state which they assume subsequent to operation of one of the fuses 42 so that the circuit interrupting switch is in open position and the whole circuit is derived of current.

In Fig. 6 is illustrated diagrammatically a protective arrangement in which a fuse of the type illustrated in Fig. 4 is employed for effecting the sectionalizing of an electric current or more specifically for the isolation of electrical converting apparatus, which may be either a rectifier or an inverter, upon the occurrence of a fault therein. In this case the fuses 42 are connected in the phase conductors of the alternating current side of a conversion apparatus 51 and have associated therewith the inductive coils 43 in a manner similar to that illustrated in Fig. 5. The alternating current circuit interrupting switch 49 and the control circuit therefor incorporating the inductive coils 43 are also substantially the same as illustrated in Fig. 5. In addition, the direct current side of the conversion apparatus is provided with an interrupting switch 52 which is biased to open position by means of a spring 53 and which is provided with an operating or holding coil 54 which is connected to relay 47 in parallel with the coil 48 of the interrupting device 49. Upon operation of any one of the fuses 42 due to a fault in its corresponding phase, the relay 47 drops out in a manner similar to that described in connection with the arrangement of Fig. 5 and both the holding coils 48 and 54 are deenergized so that the interrupting devices 49 and 52 respectively are operated to open position to thereby effect isolation of the conversion apparatus from the remainder of the electric circuit.

What I claim as new and desire to secure by Letters Patent in the United States is:

1. A protective device for an electric circuit, including in combination a pair of relatively movable terminal elements, a fusible element operative normally to maintain said terminal elements in predetermined relationship, means for effecting relative movement apart of said terminal elements upon rupture of said fusible element, an inductive device adapted to be connected in an electric control circuit, and means operative responsively to movement apart of said terminal elements for effecting a change in the inductance of said inductive device.

2. A protective device for an electric circuit, including in combination a pair of terminals, means supporting said terminals for movement relative to each other, a fusible element extending between said terminals and arranged normally to maintain the terminals in predetermined relationship, means operative upon rupture of said fusible element for effecting relative movement apart of said terminals, an inductive coil arranged adjacent the path of movement of one of said terminals, and a magnetizable member supported for movement with said one terminal and relative to the magnetic field of said coil for effecting a change in the inductance of the coil in response to movement apart of said terminals.

3. In an electric protective device including an enclosing casing, a pair of terminals in said casing, means supporting one of said terminals for movement relative to the other terminal, a fusible element normally operative to maintain said terminals in predetermined relationship, means for effecting relative movement apart of said terminals upon rupture of said fusible element, a magnetizable element carried by said supporting means for movement with said one terminal and an inductive coil disposed adjacent the path of movement of said magnetizable element for variation of the inductance of the coil in response to movement apart of the terminals.

4. A protective device for an electric circuit including in combination a fixedly mounted hollow tubular casing having one end open, a second tubular casing of less diameter than said first casing mounted for axial sliding movement within the first casing, a pair of electric connection terminals mounted one in each of said casings, a fusible element extending between said terminals and normally operative to maintain said casings in telescoped relationship, means operative to draw said slidable casing at least partially out of said fixed casing upon rupture of said fusible element, an inductive coil mounted substantially coaxially of said casings, and a magnetizable core member mounted on said slidable casing for movement therewith, said core member being so located that it is removed from the center of said coil when said fusible element is intact and that it is moved substantially into the center of the coil when the fusible element ruptures.

5. A protective device for an electric circuit including in combination a hollow tubular casing having means for closing the ends thereof and having an arc quenching liquid in the interior thereof, a pair of telescoped tubular members disposed in said casing, one of which members is fixedly mounted and the other of which members is axially slidable with relation to the fixed member and each of said members having an electrical connection terminal mounted therein, a fusible element extending between said terminals and normally operative to maintain said members in telescoped relationship, means in said casing for drawing said slidable member partially out of said fixed member upon rupture of said fusible element, an inductive coil mounted concentrically of said casing, and a magnetizable core member mounted on said slidable member for movement substantially into the center of said coil upon rupture of said fusible element, said slidable member having also means for directing streams of said arc quenching liquid into the space adjacent said terminals upon movement of said slidable member due to rupture of said fusible element.

6. The combination with an electric circuit and a circuit interrupting device therefor, of means for controlling the operation of said interrupting device including a control circuit normally having predetermined electrical characteristics, a fuse device connected in said first mentioned circuit, and variable impedance means connected to be controlled by said fuse device for varying the electrical characteristics of said control circuit upon operation of said fuse device.

7. In a protective arrangement for an electric circuit, the combination of switching means operable for interrupting the circuit, means for effecting operation of the switching means to interrupt the circuit including an electric control circuit having a variable inductance means connected therein, fuse means connected in said first mentioned circuit, and means operative upon operation of said fuse means for varying the inductance of said variable inductance means.

8. The combination with an electric circuit and a circuit interrupting device therefor, of means for effecting operation of said interrupting device including an electric control circuit having an inductive device connected therein, a fuse connected in said first mentioned circuit, and means operative to vary the reluctance of the magnetc circuit of said inductive device upon rupture of said fuse.

9. In combination, an electric circuit, switching means operable for interrupting the circuit, means including a control circuit connected for controlling the operation of said switching means, an inductive coil connected in said control circuit, a fuse device connected in said first mentioned circuit and including a pair of relatively movable terminals having a fusible element extending therebetween and means operative upon rupture of the fusible element for drawing the terminals apart, and a magnetizable member mounted for movement with one of said terminals relative to the magnetic field of said coil upon rupture of the fusible element to thereby change the inductive reactance of said control circuit.

10. In combination with a polyphase alternating current circuit and circuit interrupting means therefor of fault responsive protective means for controlling said interrupting means in response to abnormal conditions of said circuit including a plurality of fuse devices connected one in each of the phase conductors of said circuit, a plurality of variable impedance devices arranged each to have its impedance changed by operation of a respective one of said fuse devices, and means for effecting operation of said interrupting means to interrupt said circuit upon the occurrence of such change in any one of said impedance devices due to the operation of its associated fuse device.

11. In combination with a section of an electric system, protective means for isolating said section upon the occurrence of a fault therein including a circuit interrupting device at each end of said said section, fuse means connected in said section between said interrupting devices, variable impedance means arranged to have the impedance thereof changed by operation of said fuse means, and means for effecting operation of said circuit interrupting devices upon the occurrence of such change in said variable impedance means due to the operation of said fuse means.

GUSTAV MÜLLER.